United States Patent [19]
Uchida

[11] Patent Number: 6,108,058
[45] Date of Patent: *Aug. 22, 2000

[54] FIELD SEQUENTIAL PI CELL LCD WITH COMPENSATOR

[75] Inventor: Tatsuo Uchida, Miyagi-ken, Japan

[73] Assignee: Tohoku Techno-Brains Corporation, Sendai, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/927,687

[22] Filed: Sep. 11, 1997

[30] Foreign Application Priority Data

Apr. 30, 1997 [JP] Japan ................................ 9-112246

[51] Int. Cl.⁷ ................................................ G02F 1/1335
[52] U.S. Cl. .......................................... 349/61; 349/117
[58] Field of Search ........................................ 349/117, 61

[56] References Cited

U.S. PATENT DOCUMENTS

| | | | |
|---|---|---|---|
| 4,611,889 | 9/1986 | Buzak | 350/337 |
| 4,635,051 | 1/1987 | Bos | 340/757 |
| 5,337,068 | 8/1994 | Stewart et al. | 345/88 |
| 5,387,920 | 2/1995 | Bos et al. | 345/88 |

FOREIGN PATENT DOCUMENTS 7-84254   3/1995   Japan .

*Primary Examiner*—William L. Sikes
*Assistant Examiner*—Heidi L. Eisenhut
*Attorney, Agent, or Firm*—Evenson, McKeown, Edwards & Lenahan, P.L.L.C.

[57] ABSTRACT

The object of this invention is to provide a liquid crystal display that is able to realize a sequential color illumination method, i.e. that can advantageously achieve a high resolution full color display with no need of any color filters. For the purpose of attaining the object above, this invention provides a liquid crystal display characterized by being provided with a display panel in which a phase compensation plate is disposed in front of a bend oriented liquid crystal cell with a cell gap of 7 $\mu$m, said cell and phase compensation plate being inserted between two cross polarizers between a TFT active matrix driving each image element by dividing said display panel into elements in a matrix array, and a surface light source sequentially illuminating three color lights of red, green and blue on the rear fare of the display panel.

5 Claims, 7 Drawing Sheets

FIELD SEQUENTIAL PI CELL LCD WITH COMPENSATOR

BACKGROUND OF THE INVENTION

1. Field of the Invention

This Invention relates to a liquid crystal display that is frequently used for conventional electronic displays such as monitors of televisions and computers. More particularly, the invention relates to a liquid crystal display suitable for a sequential color illumination method, which is called "field sequential color display" as a technical term.

2. Description of the Related Art

Although conventional liquid crystal displays (abbreviated as LCD hereinafter) had been usually used for monochromatic displays, expressing arbitrary colors was made possible since a method for controlling transmittance of image elements for each color with a liquid crystal by attaching micro-color filters to each image element in a liquid crystal cell (micro-color filter method) was developed (Handbook of Liquid Crystal Device (1990), p492. edited by 142th Commission Panel of the Science Council of Japan, published by Nikkan Kogyo Shinbun-sha).

The color filter method involves, however, problems as follows:

(1) Two third or more of incident beam is wasted by being absorbed by color filters for each color; for example 70 to 90% of light energy is wasted since a red color filter absorbs blue and green spectra.
(2) Triple loss in resolution and driving circuits is inevitable since one image element is composed of three color pixel of red, green and blue.

For solving these problems, a method called a sequential color illumination method (a field sequential color method) has been developed in which three color images are sequentially displayed without attaching color filters to each image element (Liquid Crystal Display Technology (1996); by Shoichi Matsumoto. p50, published by Sangyo Tosho Co.).

To avoid twinkling to the eye due to color switching (flickering) in the sequential color illumination method described above, three colors should be switched within about 1/60s that is one flame time (image display time for a set of three colors), i.e., about 1/180s or about 6 ms, per one color. The response time of the liquid crystal should be about 3 ms or less provided that, for example, one-half of the time above is allotted for switching of each image element, or response of liquid crystals, and a back-light is turned on during remaining one-half of the time.

However, a LCD by a sequential color illumination method having a high response speed, being able to display half-tone images and being easily produced has not yet been realized.

For example, a TN type (twist nematic type) liquid crystal cell (abbreviated as TN cell) currently used for a high quality active matrix (AM) LCD can not be used for the sequential color illumination method because, though it depends on the required half-tone state, its response time is as long as 20 to 100 ms. When the liquid crystal cell is forcibly applied for the low speed sequential color illumination method, the quality of display is largely deteriorated due to the occurrence of flickering. The response is far more delayed in STN type (super twist nematic type) liquid crystal cells practically used in the simple matrix method, being 50 to 300 ms in the response times While a ferroelectric liquid crystal cell has a high response speed, it has some problems that half-tone images can be hardly displayed, cell gaps should be made very thin and a troublesome orientation treatment is required.

The inventors of this invention proposed a liquid crystal display element using a bend orientation liquid crystal cell (including a liquid crystal cell in which a twisted orientation exists at the center of the cell; abbreviated as a bend cell hereinafter) and a phase compensation plate (a phase difference plate) in Japanese Unexamined Patent Publication No. 7-84254. In this element, a biaxial phase compensation plate that three-dimensionally compensates retardation of liquid crystal cells is placed on a bend cell to suppress visual angle dependency, thereby widening visual angles of the cell. Since the bend cell can be driven by a similar voltage as that of the TN cell by designing the phase compensation plate to optically compensate orientation of liquid crystal under a low voltage, the element can be practically manufactured by a conventional production process. As shown in FIG. 8, tile response time of this bend cell (cell gap of 8 $\mu$m) is 2 to 8 ms, which is as small as 1/10 or less than that of the TN cell described above (the response time is 10 times faster). However, since the response time becomes far more larger than 3 ms depending on the switched half-tone levels (gray level), this type of cells are not yet sufficient for composing displays for the sequential color illumination method.

SUMMARY OF THE INVENTION

Accordingly, the object of the present invention is to provide a liquid crystal display that can realize a sequential color illumination method, i.e. a high resolution full color display can be advantageously attained with no need of any color filters.

The investigators of this invention found that, through intensive studies, the response speed of the cell can be made much more higher by optimizing parameters of the bend cells and device parameters, thereby completing the invention to be described hereinafter.

This invention provides a liquid crystal display characterized by being provided with a display panel in which a phase compensation plate is disposed in front of a bend oriented liquid crystal cell having a cell gap of 7 $\mu$m, said cell and phase compensation plate being inserted between two cross polarizers, a TFT active matrix driving each image element by dividing the display panel into elements in a matrix array, and a surface light source sequentially illuminating three color lights of red, green and blue on the rear face of the display panel.

The term "bend orientation liquid crystal cell (bend cell)" is literally referred to "a liquid crystal cell having a bend orientation structure" including "a liquid crystal cell having a twisted orientation at the center of the cell" that is electro-optically almost equivalent.

It is preferable that the liquid crystal cell is provided with a addressing device that allows to execute two or more times of addressing (refresh) to each image element prior to illuminating with each color light, being also preferable that materials for TFT is polysilicon.

This invention also provides a method for recording to the liquid crystal display characterized in that two or more times of recording is executed using the addressing device prior to illuminating with each color light.

DESCRIPTION OF THE PREFERRED EMBODIMENT

Figure 1:
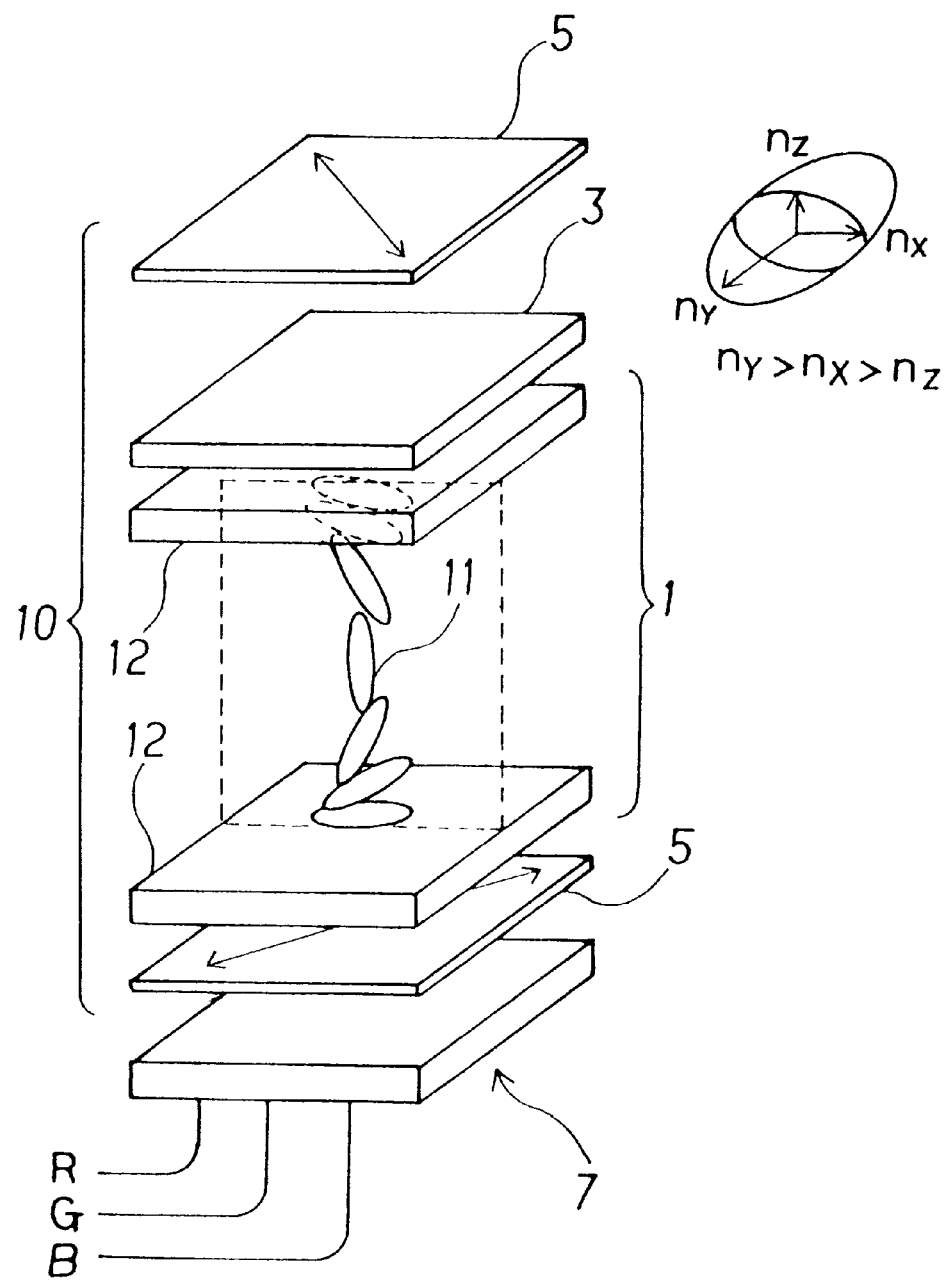
FIG. 1 is a schematic diagram of a display panel provided by this invention.

FIG. 1 is a schematic drawing provided in this invention. As is apparent from the figure, a phase compensation Plate (phase difference plate) 3 is disposed in front of a bend orientation liquid crystal cell (bend cell) 1 in the display panel 10, the bend cell 1 and phase difference plate 3 being inserted between two cross polarizers 5, 5. Also shown are a bend-oriented liquid crystal 11 and two glass plates (substrates) 12 between which the liquid crystal is inserted, and a sheet of transparent conductive film is provided on the glass plates 12. A surface light source 7 for sequentially illuminating three color lights of red (R), green (G) and blue (B) is provided at-the rear face of the display panel 10, wherein a drawing of a circuit for switching the color is omitted. The active matrix will be described hereinafter.

Liquid crystal molecules are inclined into a reversed direction with each other on the surface of the top and bottom substrates 12 in the bend cell 1. When a voltage is impressed on the cell, the liquid crystal molecules may take either a bend orientation or a orientation having a twisted orientation at the center of the cell. The liquid crystal cell according to this invention is represented by a term "bend orientation liquid crystal cell (bend cell)" because two orientations described above are electro-optically almost identical with each other.

While it was disclosed in Japanese Unexamined Patent Publication No. 7-84254 that the liquid crystal cell having such orientation has a rapid response to orientational changes (i.e. change in transmittance) against voltage changes, liquid crystals having a low viscosity, for example LIXON TD-6004XX. TD-6001XX and TD-5068XX made by Chisso Co., were adopted in order to further increase the response speed for the purpose hitherto described, together with optimizing pre-tilt angles and phase compensation plates complying with tile conditions above, as well as making cell gaps small.

Usually, the cell gap has been determined to be 7 μm or more in the conventional art since smaller cell gaps tend to decrease the transmittance under the same driving voltage. However, such cell gaps makes it difficult to attain a response speed of 3 ms or less.

On the contrary, decrease in transmittance is small according to this invention when the cell gap is less than 7 μm, which enables to attain a response speed of about 3 ms or less.

However, when one attempts to reduce the cell gap to less than 1.5 μm, a liquid crystal having a birefringence Δn of over 0.6 is required in relation to retardation. Since this requirement is difficult to be achieved by the current manufacturing technique, the lower limit of the cell gap is set to 1.5 μm for the present.

It is preferable that the viscosity of the liquid crystal is 70 mPa·s or less, since a value of more than 70 mPa·s makes the response of the liquid crystal to be retarded.

The pre-tilt angle is recommended to be set to 2 to 30°. When it is less than 2°, the bias voltage $V_{CR}$ for allowing the liquid crystal to take a bend orientation becomes several volts or more resulting in a too high driving voltage while, when it is over 30°, retardation will be so small that transmittance of the liquid crystal cell would be lowered, both of which being not preferable results. When a measure for forming a network of polymers is adopted by irradiating with ultraviolet light while a voltage is impressed on the liquid crystal, however, the pre-tilt angle can be set within a preferable range of 0.1 to 30.0°.

The optimum phase compensation plate is designed so that the orientation of liquid crystals under a low voltage (about 6V or less) is optically compensated. Refractive indices of the plate is set to be $n_y>n_x>n_z$ as shown in FIG. 1. However, these values may changed to be $n_y>n_z>n_x$ depending on physical parameters of the liquid crystal.

Figure 2:
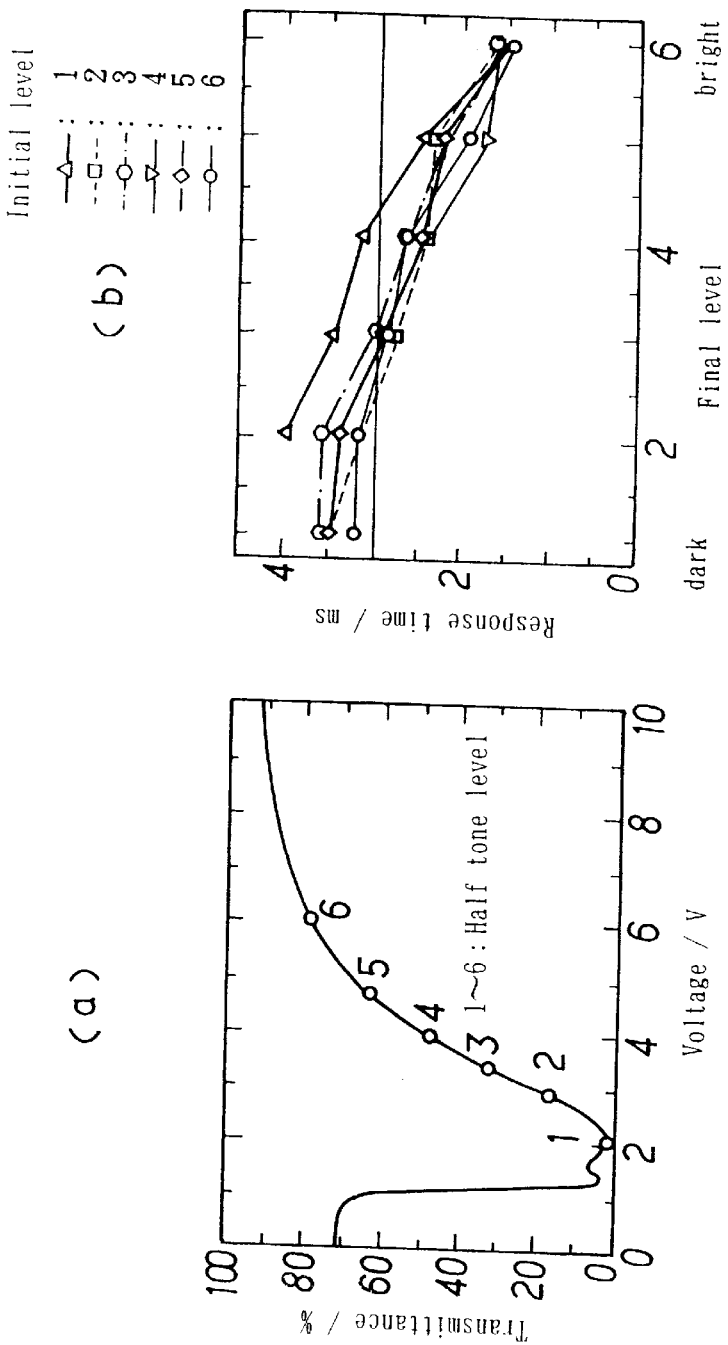
FIG. 2(a) & 2(b) is a graph indicating (a) a relation between transmittance and voltage and (b) switching response characteristics of half-tone image (1 to 6 in (a)) of a bend cell having a cell gap of 6 μm

FIG. 2 is a graph indicating (a) a relation between transmittance and voltage and (b) response characteristic of switching the half-tones image (1 to 6 in (a)) of a bend cell having a cell gap of 6 μm. In FIG. 2(b), a change from a low level to a high level in the half-tone images and a reversed change correspond to rise and decay time, respectively. It is evident from the figure that the response time mainly depends on the final level of the half-tone image, that the response time is retarded at a low voltage, and that the object that the response time should be within about 3 ms as a whole is almost attained while it is a little slower than 3 ms in the worst conditions.

Although a cross polarizer should be provided in order to visualize the changes in the orientation of liquid crystals in an electric field, those having an optical characteristics with little wave length dependency may be selected.

It is desirable that, in constructing a LCD using a display panel according to this invention, an active matrix driving method frequently used in TN cells having color filters and being able to be applied for transmissive type with a high image quality is adopted in the driving method for exciting liquid crystals.

Figure 3:
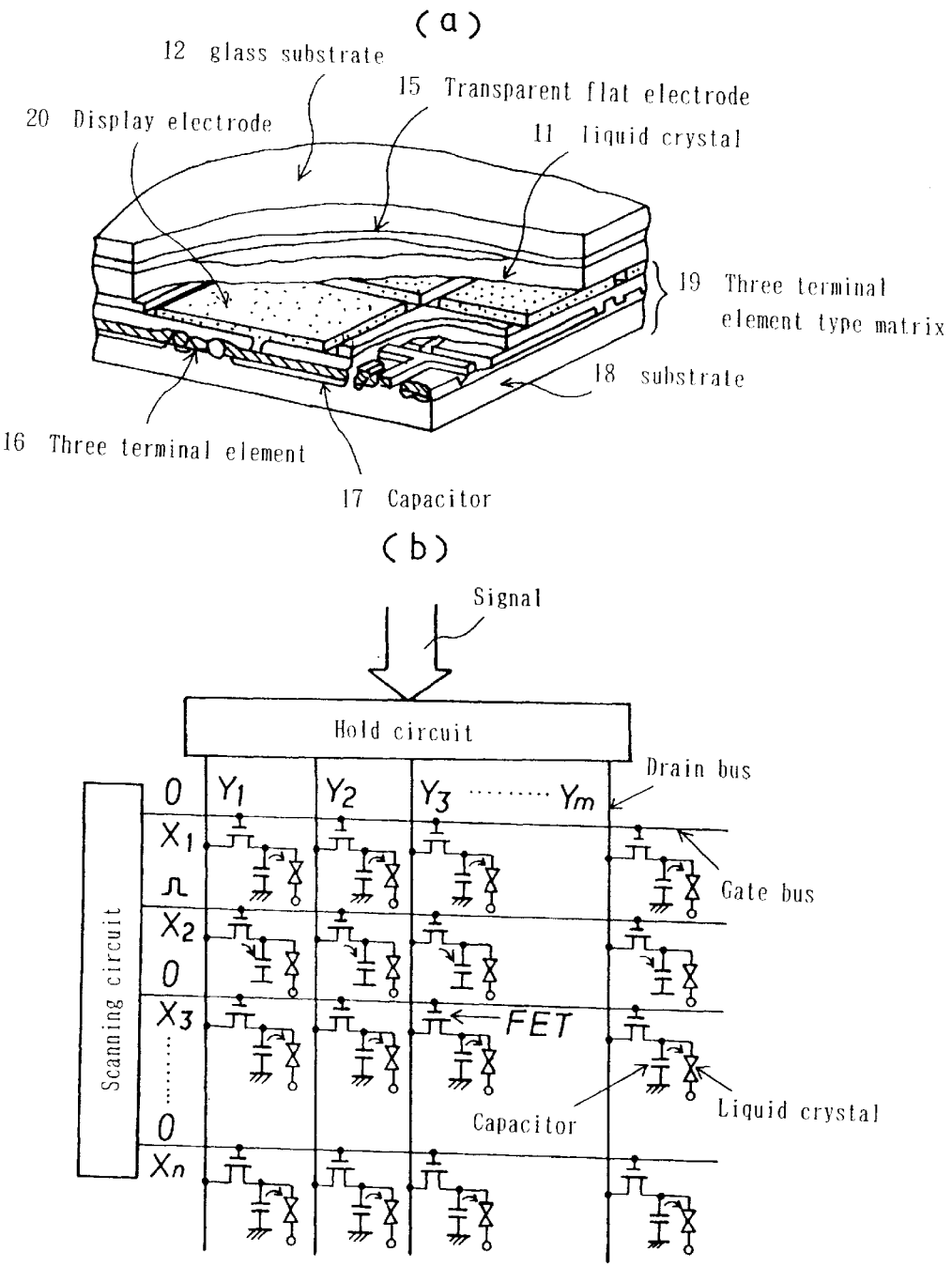
FIG. 3(a) & 3(b) is an illustrative diagram of three terminal element type AM drive LCD.

FIG. 3 is an illustrative drawing of a three terminal element type AM drive LCD. Its basic structure shown in FIG. 3(a) comprises a substrate on which a three terminal element comprising a source, gate and drain is provided in a matrix, wherein a liquid crystal layer is disposed on the three terminal element type matrix composed of a display electrode and capacitor connected to the source. A flat (common) electrode substrate without any pattern on it is usually used for the transparent counter electrode opposite to the substrate of the three terminal element type matrix electrode.

In applying the display panel according to this invention, the liquid crystal layer in FIG. 3(a) corresponds to the liquid crystal 11 in FIG. 1 while the display electrode 20 and transparent flat electrode 15 in FIG. 3(a) corresponds to the glass plate (substrate) 12 in FIG. 1. Although not shown in the figure, the phase compensation plate is disposed close to the front or rear face of the glass substrate, and the bottom face of the cross polarizer are disposed close to the front or rear face of the three terminal element matrix 19 while the top face of the cross polarizer is disposed close to the front face of the phase compensation plate or close to the front face of the glass substrate 12. In other words, the display panel is divided into image elements in an matrix array by the active matrix driving the panel.

The principle of operation of this kind of LCD is shown in FIG. 3(b). After sequentially scanning electrodes (gate bus, scanning line) $X_1, X_2, \ldots, X_n$ with a scanning circuit by a line at a time driving method, the three terminal elements on one gate bus is made into continuity (on) all at once, thereby supplying signal charges to all capacitors connected to these three terminal elements in a continuity state via signal array electrodes (drain bus, signal line) $Y_1, Y_2, \ldots, Y_n$ from a hold circuit in synchronize with this scanning (defined as refreshing (addressing)). This signal charge continues to excite liquid crystals in all the image elements on the gate bus until subsequent scanning of the frame.

While an addressing method called a "line at a time driving method" is illustrated in FIG. 3(b), a method called a "dotted sequential driving method" in which signals are sequentially addressed in each image element can be also adopted by providing a circuit corresponding to a scanning circuit connected to a gate bus instead of providing a hold circuit.

Since the spare time before allowing the image elements on the scanning line at the bottom of the display to arrive at a desired half-tone image in the sequential color illumination method is one third of that in the micro-color filter method, it is inevitable that the addressing time is made short. In this case, the orientation state will be unstable without attaining its saturated state by a usual single recording in a liquid crystal with relatively low purity and low resistivity, thereby sometimes deteriorating total image qualities. Such a problem, could be avoided by two or more times of repeated addressing.

Therefore, it is preferable in this invention to provide addressing device that allows two or more times of addressing into each image element during every illumination with each color. This will reduce the production cost since limitations on the purity of the liquid crystal are relaxed. Such a addressing device can be easily constructed because it corresponds to a control circuit in which the scanning frequency of the scanning circuit in FIG. 3(b) is 1/N of the fold frequency of the hold circuit, provided that the addressing times are N.

From the fact that the addressing time is shortened as described above, it is preferable to adopt polysilicon, which has a higher response speed than amorphous silicon widely used in conventional TN cells with color filters, as a material for TFT to be provided in the liquid crystal display according to this invention.

EXAMPLES

Figure 4:
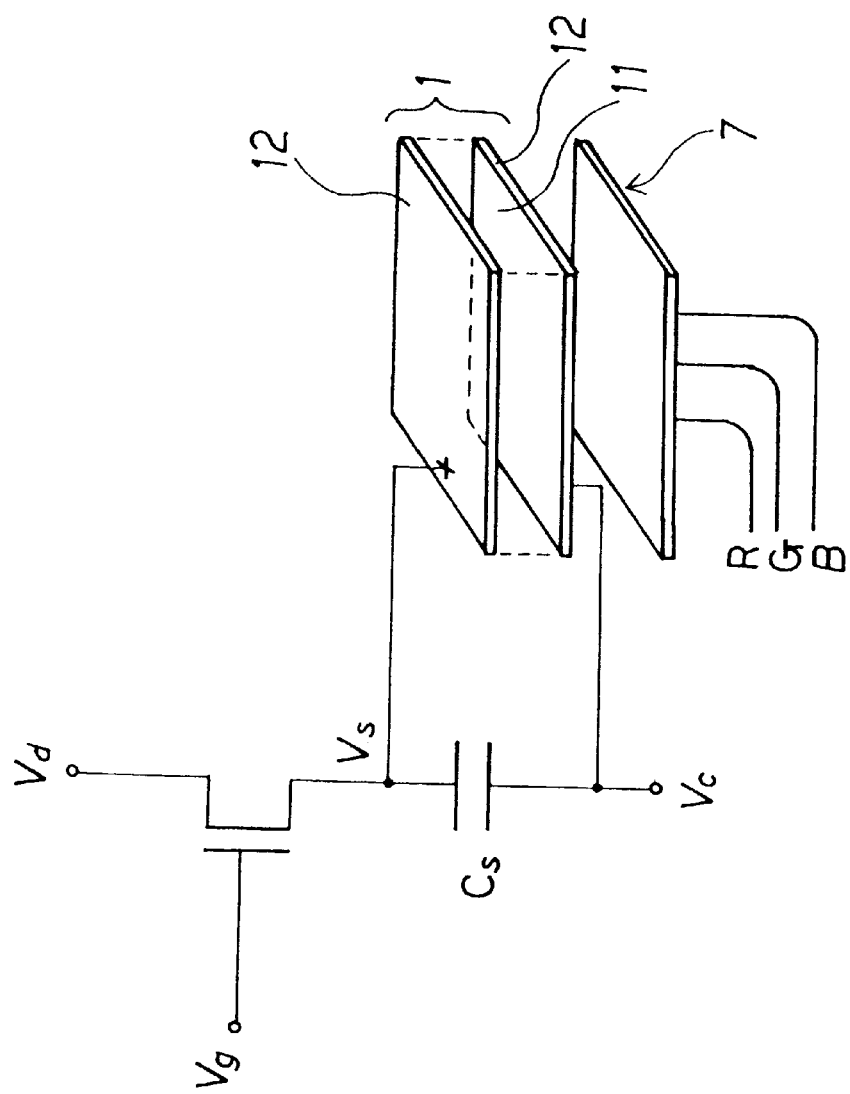
FIG. 4 is a FET drive circuit diagram simulating AM-LCD using TFT.
Figure 5:
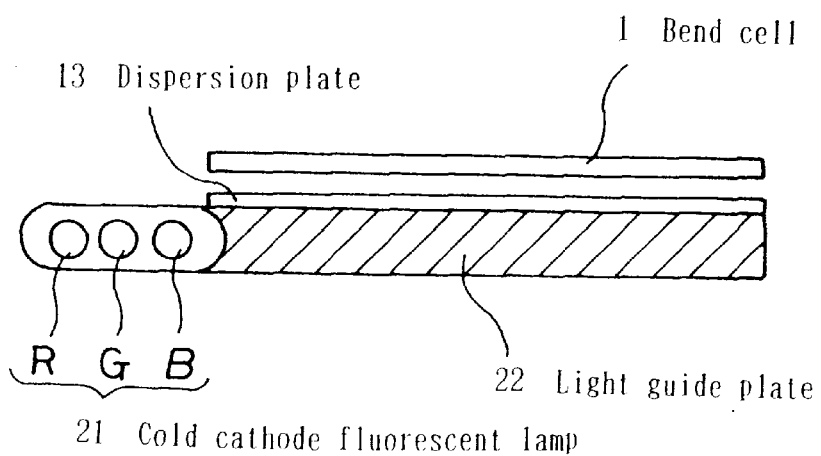
FIG. 5 is a schematic drawing illustrating the construction of a back light.
Figure 6:
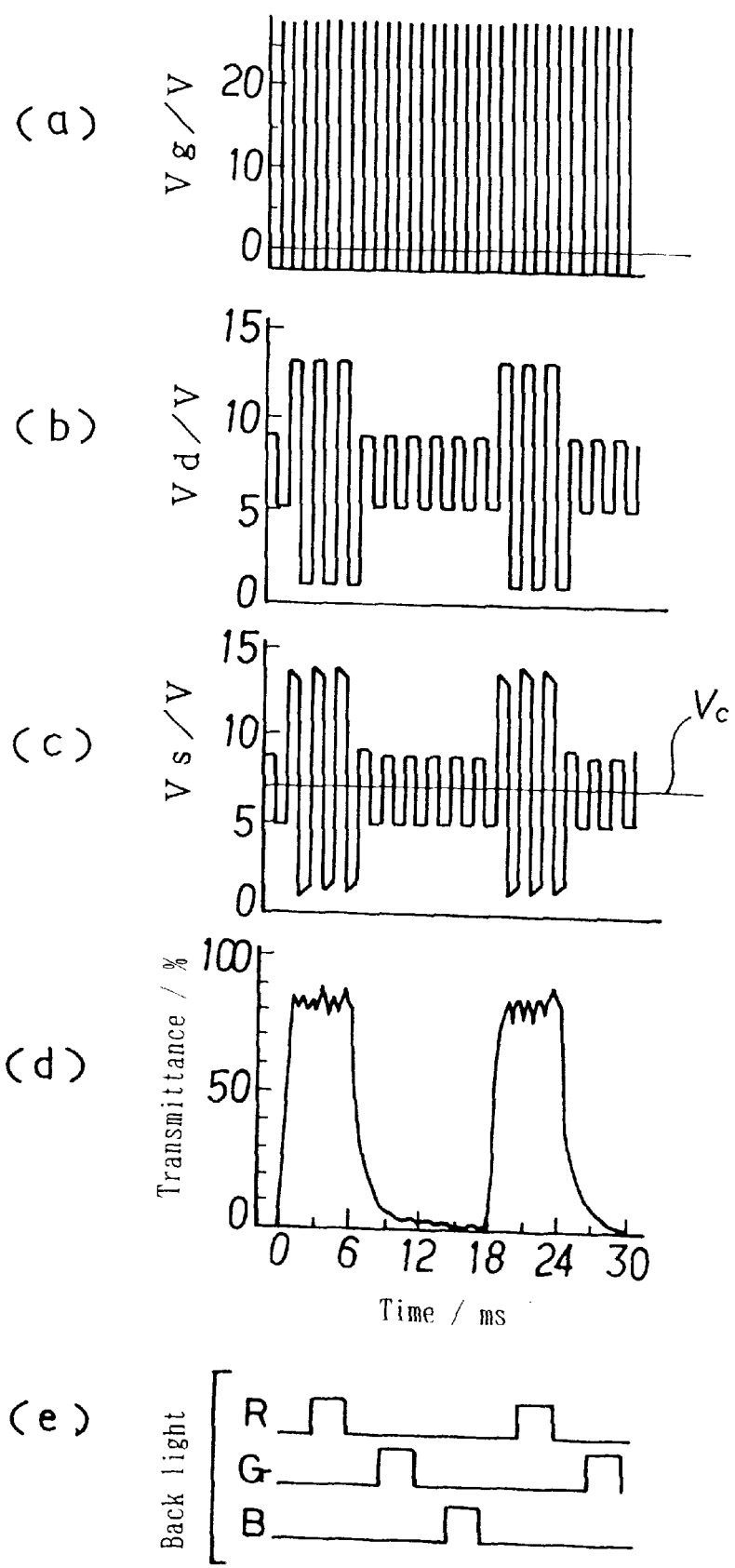
FIG. 6(a)–(e) is an illustrative drawing of AM-LCD simulated experiments. wherein (a) to (c) are gate a voltage Vg, drain voltage Vd and source voltage Vs, respectively, while (d) is a response curve for transmittance of the liquid crystal cell and (d) is an output of the back light.
Figure 7:
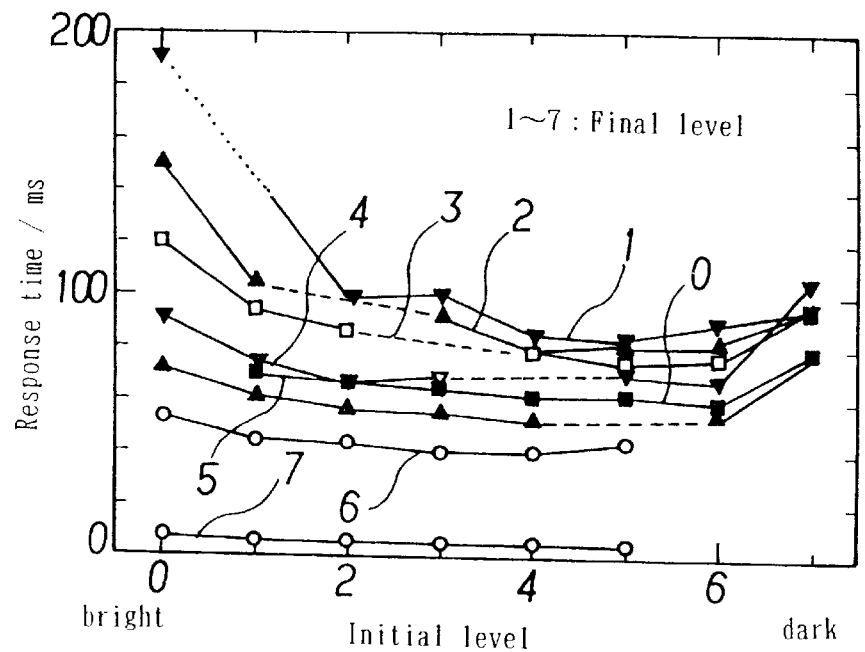
FIG. 7 is a graph indicating a response characteristic for switching half-tone images of a TN cell.
Figure 8:
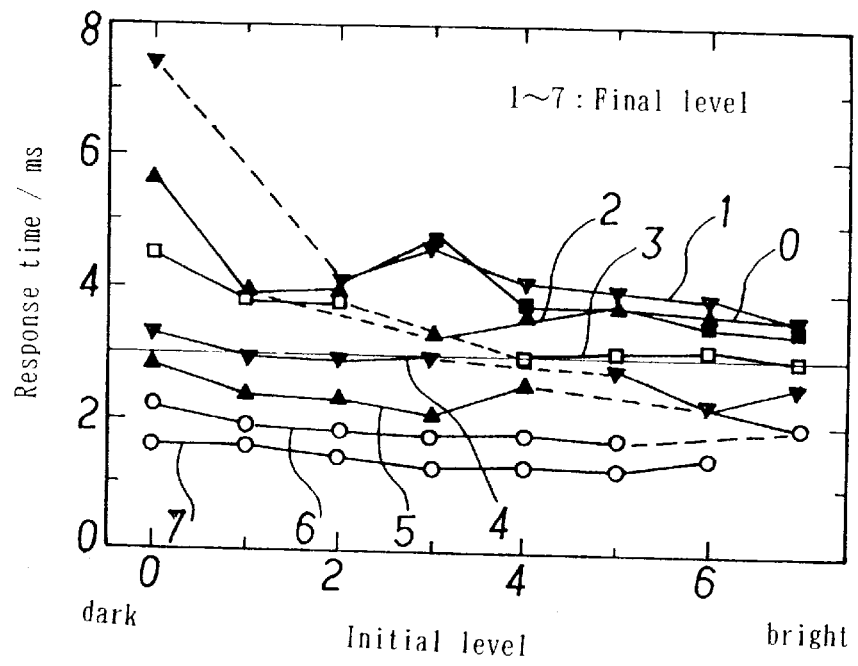
FIG. 8 is a graph indicating a response characteristic for switching half-tone images in a bend cell having a cell gap of 8 μm.

By using a bend cell having a cell gap of 6 μm, viscosity of 27.8 mPa·s and pre-tilt angle of 5°, wherein LIXON TD-6004XX made by Chisso Co. was used as a liquid crystal, display characteristics were measured by experimentally simulating an active matrix LCD (AM-LCD) using TFT. A FET (field effect transistor) driving circuit was constructed by assuming the bend cell 1 to be an image element of AM-LCD in this experiment as shown in FIG. 4, with twice of the accumulation capacity of the capacitor Cs than that of the liquid crystal cell. The plane light source 7 was constructed so that R, G and B equally and sequentially illuminate the rear face of the bend cell 1 through a light guide plate 22 and scattering plate 13 from each cold cathod fluorescent lamp emitting each color of R, G and B as shown in FIG. 5, FIG. 6 is an illustrative drawing of the AM-LCD simulation experiment in which (a) to (c) are gate voltage Vg, drain voltage Vd and source voltage Vs, respectively, while (d) and (e) being a transmittance response curve of the liquid crystal cell and an output of a back light, respectively. The common voltage Vc was set to a constant value (about 7V).

Six times of refresh (addressing) was carried out during one display time (6 ms as hitherto described) of one color component for each image element. While one addressing time corresponds to 1 ms in this case, an addressing time of 2 μs per one scanning line was made equal to the pulse width of 0.998 ms by intending to allow the addressing time to correspond to image elements in the display having 500 scanning lines.

The reason why two or more times of refresh is carried out is as follows.

The response time for orientational changes of liquid crystal molecules is 1 to 3 ms, being very slow compared with the recording time of 2 μs per one scanning line as described above. Therefore, twice or more times of refresh before changing orientation to a required degree enables more accurate display of half-tone images. At the initial stage of refresh, the voltage may be more largely changed than the voltage corresponding to the desired half-tone images, followed by impressing a prescribed half-tone voltage. Otherwise, refresh may be applied only one time by imposing a voltage determined by taking the electric capacity change accompanied by orientational changes into account. Moreover, the voltage considering the changes of half-tone images as described above may not be applied when some discrepancy in half-tone images due to electric capacity change is ignored. When refresh is applied only one time, one recording time becomes 3 ms and the recording time per one scanning line becomes 6 μs, since addressing may be carried out within about one half of the display time per one color of 6 ms. When a longer addressing time is required, the emission time of the light source is shortened, for example to 1 ms, so that the addressing time for all display panel becomes 5 ms, enabling to take as long a time as 10 μs per one scanning time. While polarity of Vd is inverted for every scanning line as in the example shown in FIG. 6, the polarity in one frame may be unchanged while inverting the polarity at the next frame. The reason why polarity of Vd is inverted is that, though orientation of liquid crystals, transmittance in other words, is determined by the root mean square value of (Vs−Vc) and is not influenced by polarity, the liquid crystal would be broken when a voltage with an identical polarity is kept to be impressed.

FIG. 6 illustrates an example where a voltage impression pattern was applied by changing only R. A liquid crystal shutter (half-tone variable shutter) is made open within a display period of R while it is made close within a display period of G and B in FIG. 6(e). The values of |Vs−Vc| corresponding to open (half-tone image 6) and close (half-tone image 1) are 6V and 2V, respectively, as shown in FIG. 6(c). As a result, transmittance of the liquid crystal rapidly responded to the impressed voltage attaining a response time of 3 ms in both rise and decay periods, thereby obtaining a clear monochromatic display of R.

Similarly, the experiments where the shutter is made open during the display period of G or B is carried out, obtaining a clear monochromatic display for G or B.

It was also confirmed that each synthesized color display can be obtained with a half-tone image of 6 by an experiment in which the shutter is made open for combined two or more of colors of R, G and B, and that each synthesized color display with a desired intensity can be obtained by an experiment in which an initial and final levels of the half-tone image are changed in many combinations other than a combination of open and close (half-tone image of 1 and 6) for every combination among R, G and B.

It was made clear from the simulation experiments on AM-LCD described above that a full color display without any flicker can be realized when an appropriate profile of driving wave is devised.

A remarkable effect for realizing a full color liquid crystal display with no need of any color filter and being superior to conventional LCD in resolution, view angle and productivity can be exhibited according to this invention.

What is claimed is:

1. A liquid crystal display having enhanced response speed, efficiency and picture quality comprising a sequential color illumination display panel having a response speed of approximately 3 ms while displaying half-tone and color images in which a phase compensation plate is disposed in front of a bend orientation liquid crystal cell having a cell gap of 7 μm or less, said cell and phase compensation plate being inserted between two crossed polarizers, a TFT active matrix driving each image element by dividing said display panel into elements in a matrix array, and a surface light source sequentially illuminating three color lights or red, green and blue on the rear face of the display panel.

2. A liquid crystal display according to claim 1, further comprising an addressing device for executing two or more times of addressing into each image element prior to illumination with each color light.

3. A liquid crystal display according to claim 1, wherein the material for said TFT is polysilicon.

4. A liquid crystal display according to claim 2, wherein the material for said TFT is polysilicon.

5. A liquid crystal display having enhanced response speed, efficiency and picture quality comprising a sequential color illumination display panel having a response speed of approximately 3 ms while displaying half-tone and color images in which a phase compensation plate is disposed in front of a bend orientation liquid crystal cell having a cell gap of between about 6 μm to 7 μm, said cell and phase compensation plate being inserted between two crossed polarizers, a TFT active matrix driving each image element by dividing said display panel into elements in a matrix array, and a surface light source sequentially illuminating three color lights or red, green and blue on the rear face of the display panel.

* * * * *